US007896385B2

(12) United States Patent
Every

(10) Patent No.: US 7,896,385 B2
(45) Date of Patent: Mar. 1, 2011

(54) FOLDABLE WHEELCHAIR

(76) Inventor: Michael Every, Highland, CA (US)

(*) Notice: Subject to any disclaimer, the term of this patent is extended or adjusted under 35 U.S.C. 154(b) by 278 days.

(21) Appl. No.: 12/235,347

(22) Filed: Sep. 22, 2008

(65) Prior Publication Data

US 2009/0079159 A1 Mar. 26, 2009

Related U.S. Application Data

(60) Provisional application No. 60/974,214, filed on Sep. 21, 2007.

(51) Int. Cl.
*B62M 1/00* (2010.01)

(52) U.S. Cl. .................... 280/650; 280/250.1; 280/642; 280/304.1; 280/47.38

(58) Field of Classification Search ............. 280/47.38, 280/47.4, 250.1, 287, 304.1, 641, 642, 644, 280/647, 650, 657, 658; 297/16.1, 16.2, 297/DIG. 4; 180/208
See application file for complete search history.

(56) References Cited

U.S. PATENT DOCUMENTS

| | | | | | |
|---|---|---|---|---|---|
| 2,181,420 | A | * | 11/1939 | Everest et al. | 280/250 |
| 4,082,348 | A | * | 4/1978 | Haury | 297/45 |
| 4,280,716 | A | * | 7/1981 | Vonsbaek et al. | 280/642 |
| 4,326,732 | A | * | 4/1982 | Gall et al. | 280/642 |
| 4,392,690 | A | * | 7/1983 | Anderson | 301/121 |
| 4,555,121 | A | * | 11/1985 | Lockard et al. | 280/30 |
| 4,595,212 | A | * | 6/1986 | Haury et al. | 280/250.1 |
| 4,598,944 | A | * | 7/1986 | Meyer et al. | 297/183.9 |
| 4,679,816 | A | * | 7/1987 | Riikonen | 280/650 |
| 4,684,149 | A | * | 8/1987 | Meyer | 280/650 |
| 4,684,171 | A | * | 8/1987 | Roy et al. | 297/47 |
| 4,834,413 | A | * | 5/1989 | Patel et al. | 280/304.1 |
| 4,887,826 | A | * | 12/1989 | Kantner | 280/250.1 |
| 4,966,379 | A | * | 10/1990 | Mulholland | 280/242.1 |
| 5,154,438 | A | * | 10/1992 | Barclay | 280/250.1 |
| 5,158,309 | A | * | 10/1992 | Quigg | 280/5.22 |
| 5,240,276 | A | | 8/1993 | Coombs | |
| 5,292,144 | A | * | 3/1994 | Sosnoff | 280/304.1 |
| 5,328,247 | A | * | 7/1994 | Lovins | 297/423.3 |
| 5,356,172 | A | * | 10/1994 | Levy et al. | 280/650 |
| 5,480,172 | A | * | 1/1996 | James | 280/250.1 |
| 5,560,635 | A | * | 10/1996 | Roy | 280/642 |
| 5,568,933 | A | | 10/1996 | Mizuno | |
| 5,593,173 | A | * | 1/1997 | Williamson | 280/642 |
| 5,727,802 | A | * | 3/1998 | Garven et al. | 280/250.1 |
| 5,727,809 | A | * | 3/1998 | Ordelman et al. | 280/650 |
| 5,791,672 | A | * | 8/1998 | Masclet | 280/250.1 |
| 5,816,614 | A | * | 10/1998 | Kramer et al. | 280/775 |

(Continued)

*Primary Examiner*—J. Allen Shriver, II
*Assistant Examiner*—Brodie Follman
(74) *Attorney, Agent, or Firm*—Knobbe Martens Olson & Bear, LLP

(57) ABSTRACT

A foldable wheelchair includes a frame having a seat bottom and a seat back movable relative to the seat bottom, wherein the seat back can be moved between a folded position such that the seat back extends generally parallel to a plane defined by the seat bottom and one or more unfolded positions to provide back support to a user. The foldable wheelchair can have a leg support movable relative to the seat bottom and can be moved between an unfolded position to support a user's legs and a folded position such that the leg support extends generally parallel to said plane defined by the seat bottom. In the folded position, the seat back, seat bottom and leg support define generally parallel planes.

15 Claims, 11 Drawing Sheets

U.S. PATENT DOCUMENTS 5,855,387 A * 1/1999 Gill et al. .................... 280/283
6,027,132 A * 2/2000 Robinson et al. ......... 280/250.1
6,079,725 A * 6/2000 Lazaros ................... 280/250.1
6,161,856 A * 12/2000 Peterson .................. 280/250.1
6,168,178 B1 * 1/2001 Garven et al. ............ 280/250.1
6,224,156 B1 * 5/2001 Fleigle .................... 297/354.1
6,241,275 B1 6/2001 Slagerman
6,296,265 B1 * 10/2001 Lovins .................... 280/250.1
6,343,805 B1 2/2002 Roy
6,425,597 B1 * 7/2002 Peterson .................. 280/250.1
6,464,243 B2 * 10/2002 Roche ........................ 280/650
6,572,133 B1 * 6/2003 Stevens ...................... 280/642
6,616,172 B1 9/2003 Cockram
6,685,271 B1 * 2/2004 Chang ..................... 297/423.4
6,705,629 B2 * 3/2004 Post et al. ................ 280/250.1
6,715,784 B2 * 4/2004 Koerlin et al. .............. 280/650
6,733,018 B2 * 5/2004 Razon ................... 280/87.021
6,843,500 B2 * 1/2005 Li .............................. 280/642
6,889,993 B2 5/2005 Chen et al.
6,976,697 B2 * 12/2005 Britton et al. ............... 280/647
6,976,699 B2 * 12/2005 Koerlin ...................... 280/650
7,007,965 B2 * 3/2006 Bernatsky et al. ........ 280/304.1
7,032,917 B1 * 4/2006 Chelgren ................. 280/304.1
7,055,840 B1 * 6/2006 Kelso ...................... 280/250.1
7,073,801 B2 * 7/2006 Sanders et al. ........... 280/87.05
7,419,182 B2 * 9/2008 Goertzen et al. ............ 280/647
7,455,362 B2 * 11/2008 Hanson et al. .............. 297/363
7,520,518 B2 * 4/2009 Peterson et al. .......... 280/250.1
7,651,103 B1 * 1/2010 Peridon ..................... 280/5.22
2001/0007390 A1 * 7/2001 Klaiber ....................... 280/647
2001/0008335 A1 * 7/2001 Roche ........................ 280/278
2002/0145271 A1 * 10/2002 Sanchez ..................... 280/658
2002/0175485 A1 * 11/2002 Tanaka ................ 280/124.125
2003/0006578 A1 * 1/2003 Melgarejo et al. ........ 280/250.1
2003/0137119 A1 * 7/2003 Razon ................... 280/87.021
2004/0000773 A1 * 1/2004 Li .............................. 280/642
2004/0021300 A1 * 2/2004 Tsai ........................... 280/642
2006/0087103 A1 * 4/2006 Schreiber et al. ............ 280/649
2006/0120837 A1 * 6/2006 Hung et al. ................. 414/347
2006/0163847 A1 * 7/2006 Hartenstine et al. ......... 280/642
2006/0219479 A1 * 10/2006 Petzl et al. ...................... 182/3
2007/0057542 A1 * 3/2007 Rush ....................... 297/219.1
2007/0063480 A1 * 3/2007 Porcheron ................ 280/304.1
2007/0222199 A1 * 9/2007 Schattner .................... 280/755
2007/0296178 A1 * 12/2007 Markwald ................... 280/287
2008/0185821 A1 * 8/2008 Chen et al. .................. 280/642
2008/0217966 A1 * 9/2008 Cone ........................... 297/47
2008/0252043 A1 * 10/2008 Willis ......................... 280/639
2008/0265542 A1 * 10/2008 Chong ..................... 280/250.1
2009/0194974 A1 * 8/2009 Smith ......................... 280/647
2010/0007104 A1 * 1/2010 Bennett ..................... 280/7.15
2010/0038880 A1 * 2/2010 Bagg ....................... 280/250.1

* cited by examiner

FOLDABLE WHEELCHAIR

CROSS-REFERENCE TO RELATED APPLICATIONS

This application claims the benefit of U.S. Provisional Patent Application No. 60/974,214 filed Sep. 21, 2007, the entire contents of which are incorporated herein by reference and should be considered a part of this specification.

BACKGROUND OF THE INVENTION

1. Field of the Invention

This invention relates to a wheelchair, and more particularly to a foldable wheelchair.

2. Description of the Related Art

Foldable wheelchairs are well known in the art. Generally, foldable wheelchairs are folded along a longitudinal axis of the wheelchair, via a scissors-type hinge between the wheels, so as to bring together the sides of the chair (i.e., the wheels are moved inward toward the longitudinal axis). The wheels may or may not be removable. With a canvas seat and a canvas back, such chairs may be readily and quickly folded and unfolded, though the seat material is often not particularly comfortable.

However, such foldable wheelchairs suffer from the disadvantage of bulk and weight. Folding such a chair reduces the width of the chair transverse to its longitudinal axis, but the dimensions of the height and depth of the chair remain the same. Accordingly, such a chair, even in the folded configuration, still has considerable bulk with regard to the overall volume that the chair might occupy in a place of storage (e.g., the trunk of a vehicle). Such bulk makes it difficult for a user to easily disassemble the chair and store it in a compact storage space, such as the trunk of a car, and reduces the storage space available to store other articles. Additionally, such foldable wheelchairs can be very heavy, making them more difficult for a user to lift.

Accordingly, there is a need for a compact foldable wheelchair that can be easily folded and unfolded by a user, is lightweight and has high structural strength.

SUMMARY OF THE INVENTION

In accordance with one embodiment, a foldable wheelchair is provided. The wheelchair comprises a seat bottom configured to support a user thereon. The wheelchair also comprises a seat back movably coupled to the seat bottom. The seat back is movable about an axis generally transverse to a longitudinal axis of the wheelchair between a folded position such that the seat back extends generally parallel to a plane defined by the seat bottom and one or more unfolded position so as to provide back support to the user. The wheelchair further comprises a leg support pivotably coupled to the seat bottom. The leg support is movable about a second axis generally transverse to the longitudinal axis of the wheelchair between a folded position such that the leg support extends generally parallel to said plane defined by the seat bottom and an unfolded position configured to provide support to the user's legs during use of the wheelchair. In the folded position the seat bottom, seat back and leg support extend along generally parallel planes.

In accordance with another embodiment, a foldable wheelchair is provided comprising a seat bottom frame defining a plane and configured to support a user thereon. The wheelchair also comprises a seat back frame pivotably coupled to the seat bottom about an axis generally transverse to a longitudinal axis of the wheelchair. The seat back frame is pivotable between a folded position such that the seat back extends generally parallel to a plane defined by the seat bottom and one or more unfolded position so as to provide back support to the user. The wheelchair further comprises a leg support pivotably coupled to the seat bottom about an axis generally transverse to a longitudinal axis of the wheelchair, the leg support frame movable between a folded position such that the leg support frame extends generally parallel to said plane defined by the seat bottom frame and an unfolded position configured to provide support to the user's legs during use of the wheelchair. Additionally, wheelchair comprises means for releasably locking the leg support frame in the unfolded position relative to the seat bottom frame, wherein in the folded position the seat bottom frame, seat back frame and leg support frame extend along generally parallel planes.

In accordance with still another embodiment, a method for operating a foldable wheelchair is provided. The method comprises moving a seat back pivotably coupled to a seat bottom about an axis generally transverse to a longitudinal axis of the wheelchair from an unfolded position to a folded position so that a plane defined by the seat back is generally parallel to a plane defined by a seat bottom. The method also comprises moving a leg support pivotably coupled to the seat bottom about an axis generally transverse to the longitudinal axis of the wheelchair from an unfolded position to a folded position so that a plane defined by the leg support is generally parallel to a plane defined by a seat bottom. Additionally, the method comprises moving one or more rear wheel supports releasably coupled to the seat bottom from a deployed position where a plane defined by the rear wheel support is generally non-parallel to the plane defined by the seat bottom to a folded position where the plane defined by the rear wheel support is generally parallel to the plane defined by the seat bottom. In the folded position the seat bottom, seat back and leg support extend along generally parallel planes.

BRIEF DESCRIPTION OF THE DRAWINGS

These and other features, aspects and advantages of the present inventions will now be described in connection with preferred embodiments, in reference to the accompanying drawings. The illustrated embodiments, however, are merely examples and are not intended to limit the inventions. The drawings include the following 11 figures.

DETAILED DESCRIPTION OF THE PREFERRED EMBODIMENTS

In the following detailed description, terms of orientation such as "top," "bottom," "upper," "lower," "front," "rear," and "end" are used herein to simplify the description of the context of the illustrated embodiments, and are viewed from the vantage point of a user seated on the wheelchair. Likewise, terms of sequence, such as "first" and "second," are used to simplify the description of the illustrated embodiments. Because other orientations and sequences are possible, however, the present invention should not be limited to the illustrated orientation. Those skilled in the art will appreciate that other orientations of the various components described above are possible.

Figure 1:
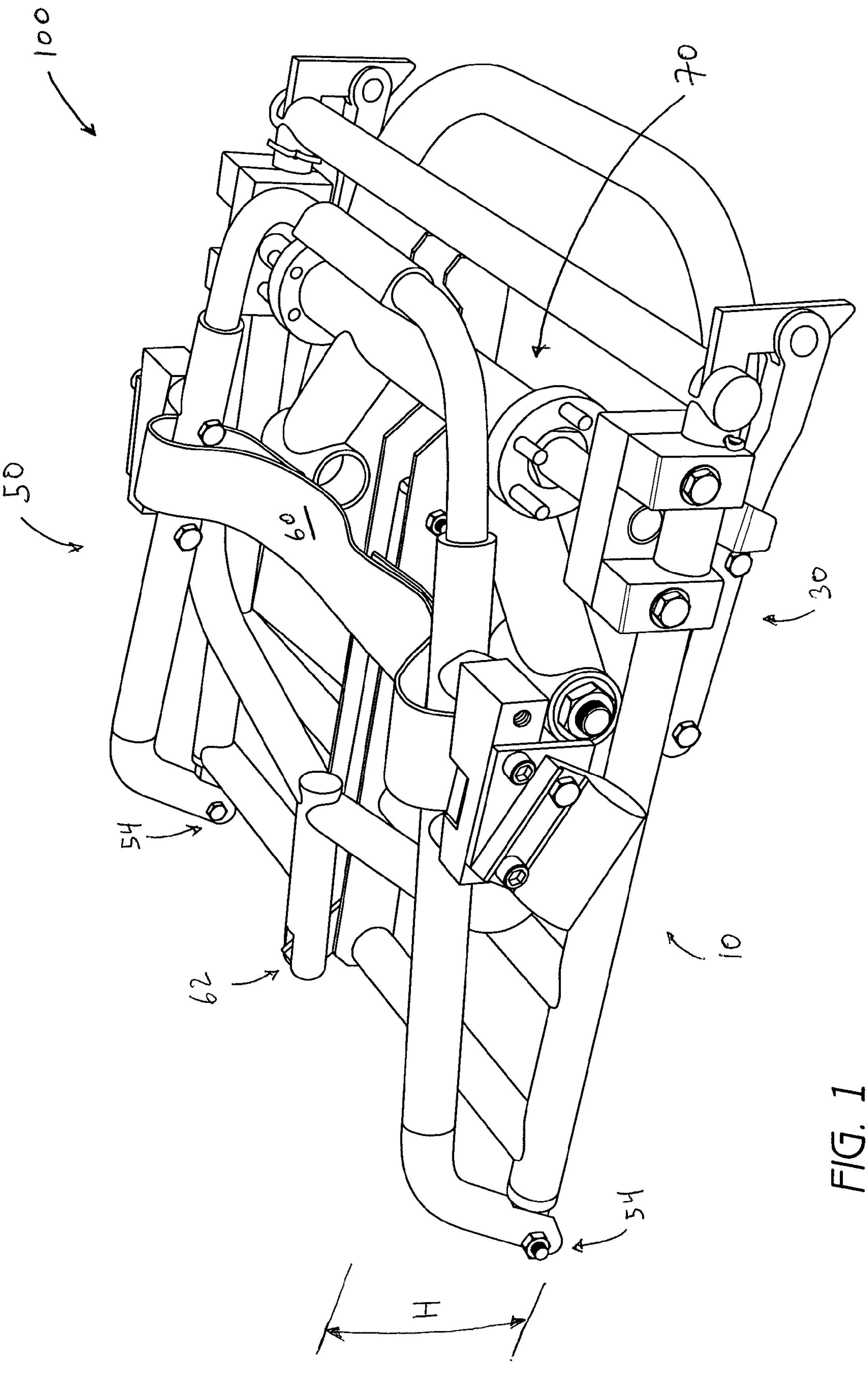
FIG. 1 is a schematic profile view of a wheelchair frame in a folded configuration, in accordance with one embodiment.

FIG. 1 illustrates one embodiment of a foldable wheelchair in a folded configuration. The wheelchair includes a frame 100 having a seat bottom portion 10, a seat back portion 30 and a leg support frame 50. A support strap 60 can extend across the leg support frame 50 for additional support of the legs of a user. Additionally, the leg support frame 50 can include a cross-member 52 that can support a user's feet thereon during use. The wheelchair frame 100 also includes a rear wheel axle support 70 for attaching rear wheels to the wheelchair frame 100.

Additionally, the wheelchair frame 100 includes front wheel mounts 80 coupled to the leg support frame 50. In the illustrated embodiment, the front wheel mounts 80 are bolted to the leg support frame 50. In another embodiment, the front wheel mounts 80 can be welded to the leg support frame 50. In still another embodiment, the front wheel mounts 80 can be movably coupled (e.g., via clamps) to the leg support frame 50, for example, to accommodate front wheels of different sizes. In the illustrated embodiment, the front wheel mounts 80 can include sockets 82 that lockingly receive castor wheels 120 (see FIG. 10) therein. The sockets 82 can be angled relative to the leg support frame 50 in such a manner that an axis of the sockets 82 is generally vertical when the wheelchair frame 100 is in the unfolded configuration (see FIG. 10).

As shown in FIG. 1, following removal of the wheels from the wheelchair, the wheelchair frame 100 can be folded into a substantially compact configuration where the seat back portion 30, leg support frame 50 and rear wheel axle support 70 are moved into a position generally parallel to a plane defined by the seat bottom portion 10. In the folded configuration, as shown in FIG. 1, the wheelchair frame 100 advantageously has a height H of less than about six inches, more preferably less than about 5.5 inches, and most preferably about five inches. Accordingly, the wheelchair frame 100 achieves a substantially compact configuration in the folded state, facilitating lifting and storing of the wheelchair in a compact storage space (e.g., a car trunk, car rear seat, or a suitcase), as well as traveling (e.g., on a plane, car, train or ship) with the wheelchair.

With continued reference to FIG. 1, the leg support frame 50 is pivotally coupled to the seat bottom portion 10 via one or more pivot joint. In the illustrated embodiment, three pivot joints couple the leg support frame 50 to the seat bottom portion 10. Two of the pivot joints 54 couple lateral elongate members 56 of the leg support frame 50 to corresponding lateral elongate members 12 of the seat bottom portion 10. The lateral elongate members 56 of the leg support frame 50 preferably have a curved portion 58 proximate the pivot joint 54 and a generally straight portion 60.

A third pivot joint 62 couples an elongate support member 14 coupled to the seat bottom portion 10 and a fork member 64 coupled to the lateral elongate members 56 of the leg support frame 50. Preferably, the two pivot joints 54 between the lateral elongate members 12, 56 of the seat bottom portion 10 and leg support frame 50 are generally aligned with the pivot joint 62 between the elongate support member 14 and the fork member 64. In the illustrated embodiment, the third pivot joint 62 between the elongate support member 14 and fork member 64 is disposed rearwardly of the two pivot joints 54 between the lateral elongate members 12, 56 of the seat bottom portion 10 and leg support frame 50.

Figure 2:
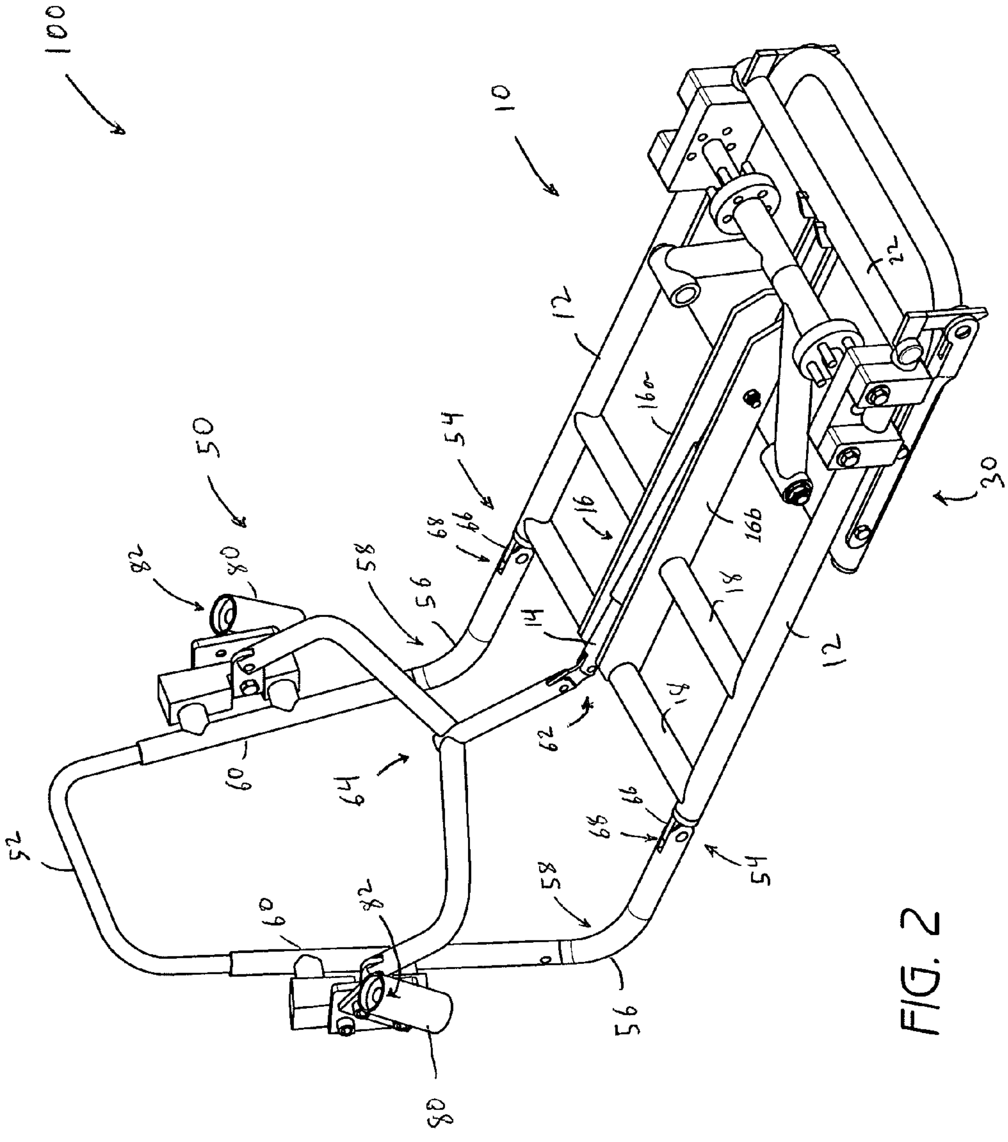
FIG. 2 is a schematic profile view of the wheelchair frame of FIG. 1 showing one step in the deployment of a leg support portion of the frame into a fully deployed configuration.
Figure 3:
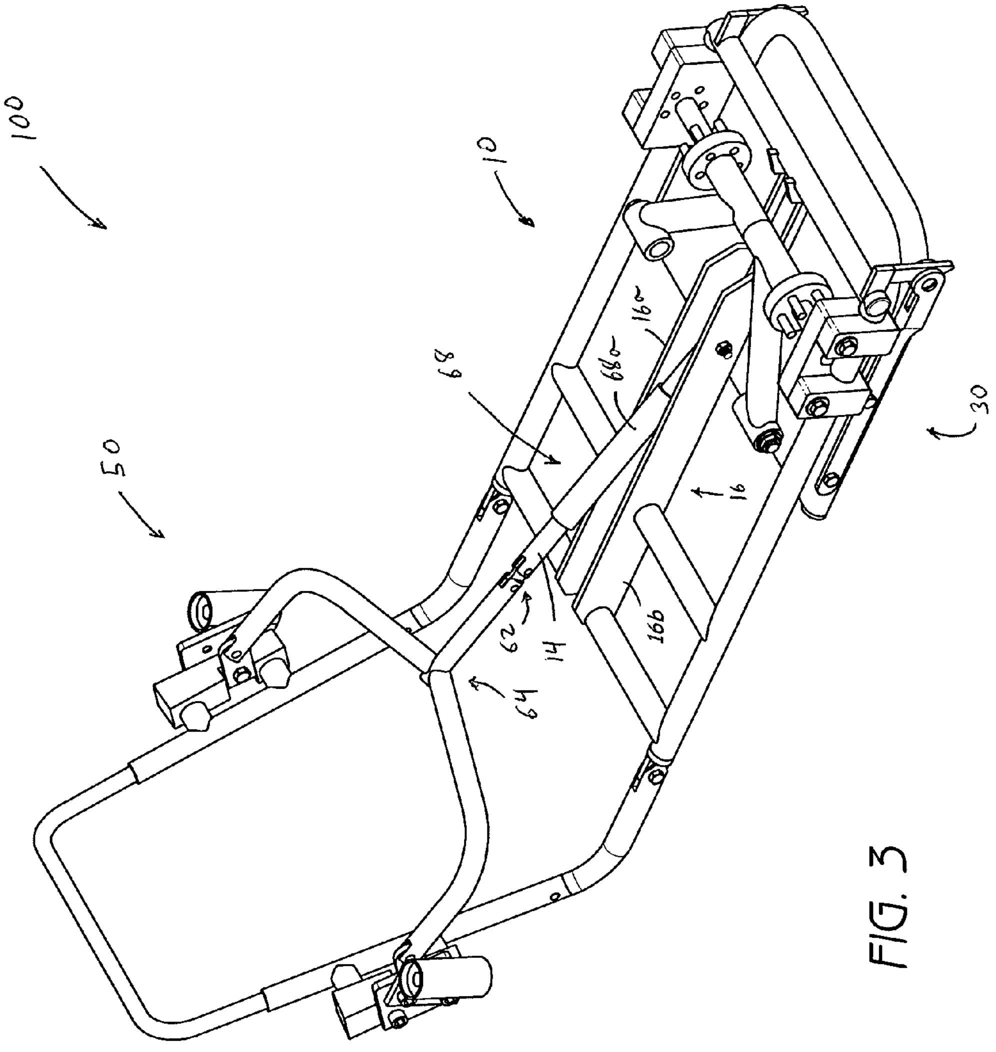
FIG. 3 is a schematic profile view of the wheelchair frame of FIG. 1 showing another step in the deployment of the leg support portion of frame into a fully deployed configuration.
Figure 4:
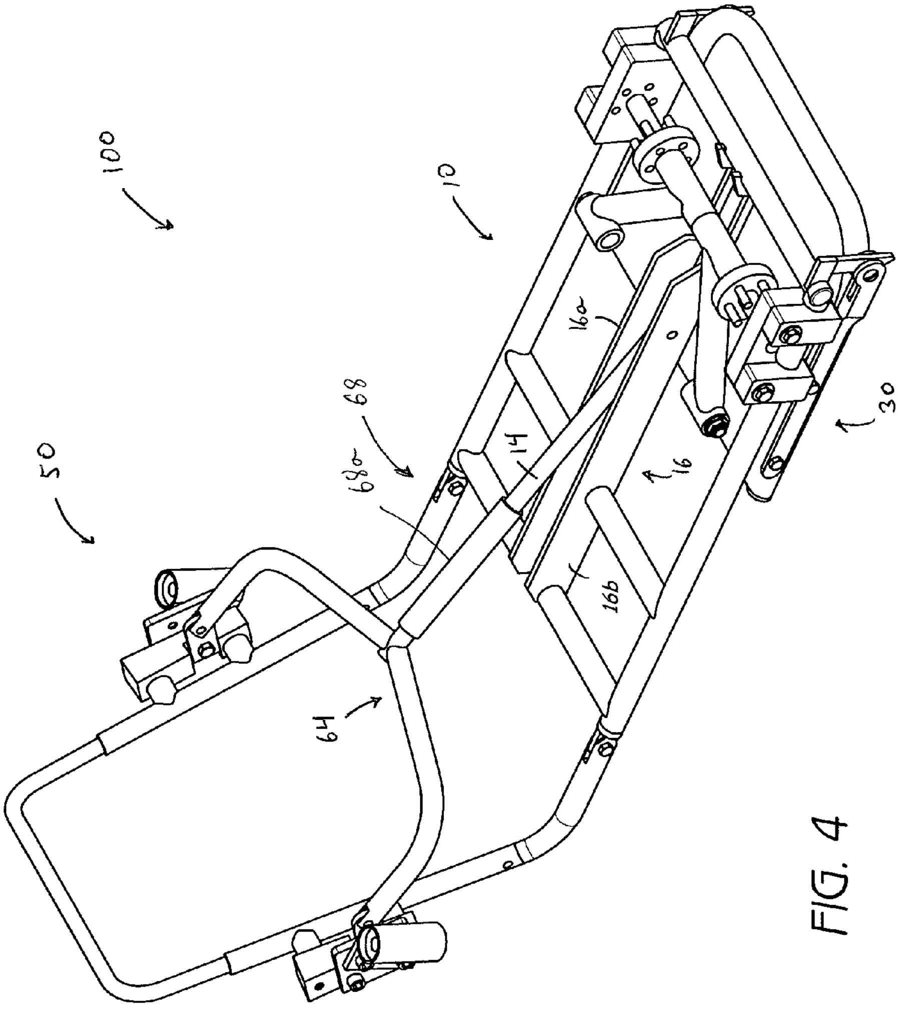
FIG. 4 is a schematic profile view of the wheelchair frame of FIG. 1 showing the leg support portion of the frame in a fully deployed configuration.

Preferably, the elongate support member 14 extends generally along a longitudinal axis of the wheelchair. As shown in FIGS. 2-4, the elongate support member 14 couples to, and extends between walls 16a, 16b of, a channel 16 of the seat bottom portion 10 that extends generally along the longitudinal axis of the wheelchair frame 100 transverse to cross-members 18 of the seat bottom portion 10. While in the folded configuration, the elongate support member 14 preferably extends into the channel 16 (see FIG. 2), thereby providing a more compact configuration.

In the illustrated embodiment, the pivot joints 54, 62 can include a protruding member 66 formed on one support member 12 coupled within a channel 68 formed in the corresponding support member 56. However, the pivot joints 54, 62 can have other suitable configurations.

FIGS. 2-4 show the wheelchair frame 100 being moved into an unfolded configuration. To unfold the wheelchair frame 100, the leg support frame 50 is rotated outward from the folded position (see FIG. 1), so that the lateral elongate members 56 of the leg support frame 50 and the lateral elongate members 12 of the seat bottom portion 10 are aligned with each other proximal the pivot joints 54. As the leg support frame 50 is unfolded, the elongate support member 14 also becomes aligned with the fork member 64. Advantageously, the alignment of the elongate support member 14 and fork member 64 inhibits the further outward rotation of the leg support frame 50.

With continued reference to FIGS. 3 and 4, the wheelchair frame 100 can have a locking mechanism 68 for substantially locking the leg support frame 50 in the fully unfolded configuration. In one embodiment, the locking mechanism 68 can include a sleeve 68a movable (e.g., slidable) over the elongate support member 14 and over the pivot joint 62 that joins it to the fork member 64 of the leg support frame 50 while the leg support frame 50 is in the unfolded position. Advantageously, the sleeve 68a, which has a simple construction, is easily actuatable to lock and unlock the leg support frame 50 in the unfolded position and facilitates the folding and unfolding of said frame 50. Additionally, the sleeve 68a advantageously fixes the leg support frame 50 in the unfolded position relative to the seat bottom portion 10 and substantially inhibits the leg support frame 50 from rotating relative to the seat bottom portion 10. Moreover, the sleeve 68a, the elongate support member 14 and the fork member 64 provide a substantially stiff wheelchair frame 100 in the unfolded position. In one embodiment, the sleeve 68a can be spring-loaded so as to be biased toward the leg support frame 50, the sleeve 68a slidable rearward to expose the pivot joint 62 and allow the folding of the leg support frame 50.

Though the locking mechanism 68 includes a sleeve in the illustrated configuration, the locking mechanism 68 can have any suitable configuration. In one embodiment, sleeves may optionally be included on the lateral elongate members 12 of the seat bottom, said sleeves movable over the pivot joints 54 between the lateral elongate members 12 of the seat bottom portion 10 and the lateral elongate members 56 of the leg support frame 50. In another embodiment (not shown), the locking mechanism can include a pin insertable through holes in the elongate support and fork members 14, 64, said holes aligning when the leg support frame 50 is in the unfolded position.

Figure 5:
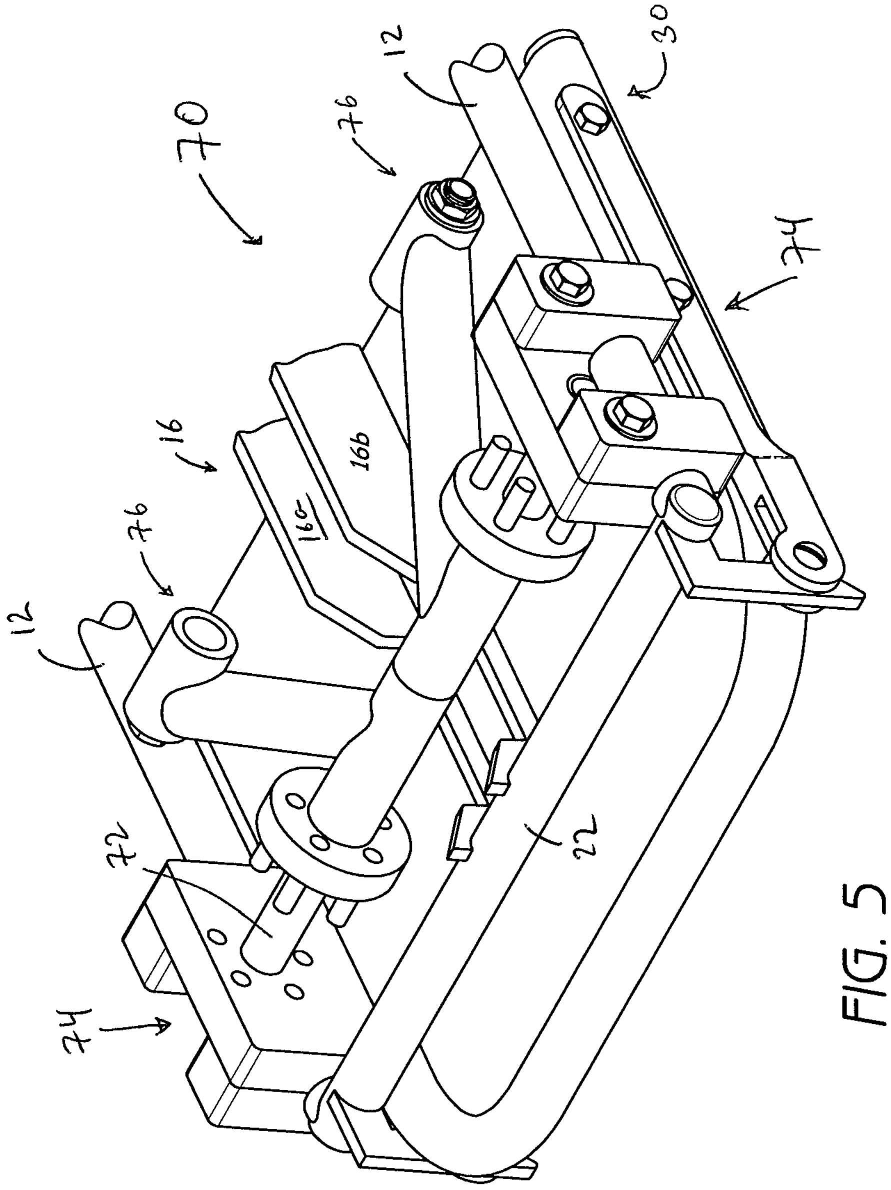
FIG. 5 is a schematic sectional view of the wheelchair frame of FIG. 1 showing a wheel support portion in a folded configuration, in accordance with one embodiment.
Figure 6:
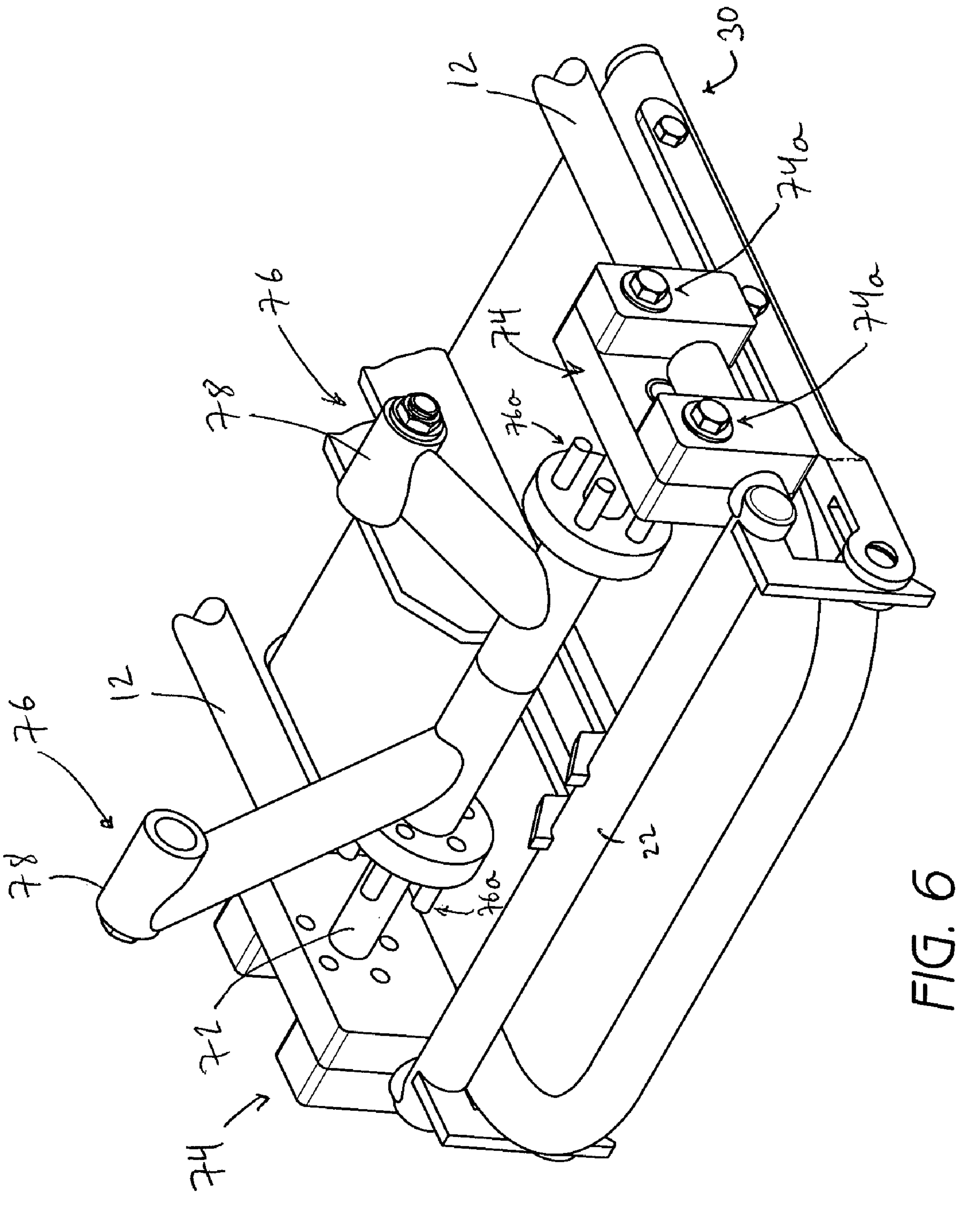
FIG. 6 is a schematic sectional view of the wheelchair frame of FIG. 1 showing one step in the deployment of the wheel support portion of FIG. 5 into a fully deployed configuration.
Figure 7:
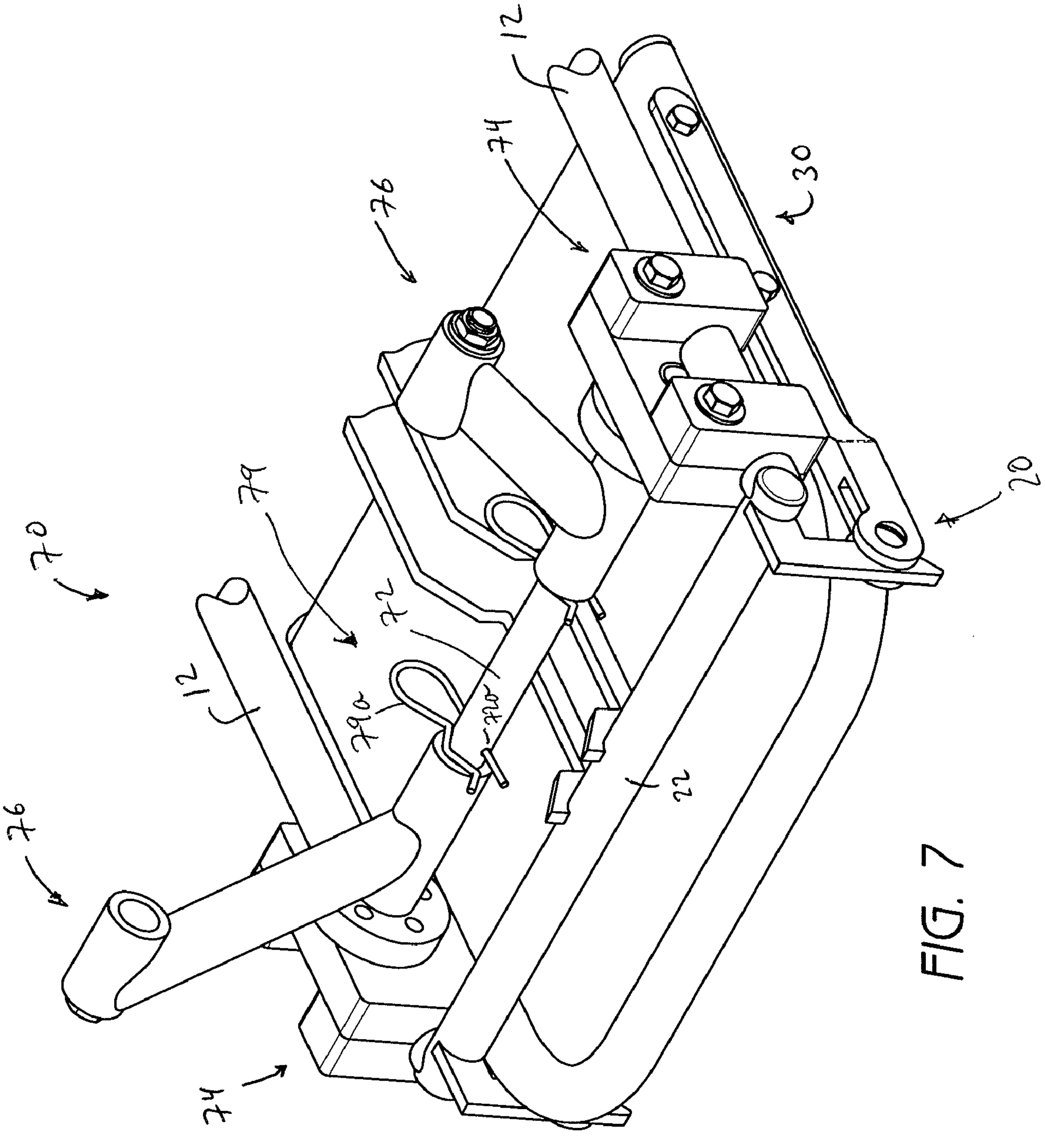
FIG. 7 is a schematic sectional view of the wheelchair frame of FIG. 1 showing the wheel support portion of FIG. 5 in a fully deployed configuration.

FIGS. 5-7 show the deployment of the rear wheel axle support 70 from the folded configuration into the deployed configuration. In the illustrated embodiment, the rear wheel axle support 70 includes an axle shaft 72 that extends between axle mounts 74 movably mounted to the lateral elongate members 12 of the seat bottom portion 10. In the illustrated embodiments, the axle mounts 74 are clamps, where each clamp clamps about one of the lateral elongate members 12 via bolts 74*a*. The axle mounts 74 can advantageously be moved along the lateral elongate members 12 and mounted at a desired location, so as to vary the balance of the wheelchair, as further discussed below.

As shown in FIGS. 5-7, the rear wheel axle support 70 also includes wheel mounts 76 rotatably coupled to the axle shaft 72, wherein the wheel mounts 76 can be mounted to the axle mounts 74 in one or more angular position. Each wheel mount 76 preferably includes a hub 78 that extends generally transverse to the longitudinal axis of the wheelchair. The hub 78 preferably receives a wheel connector, such as a bolt, therethrough to which a rear wheel 140 (see FIG. 10) can be coupled. The wheel mounts 76 can include one or more stud or peg 76*a* that can be inserted into one or more bore 74*a* formed on the axle mount 74 to substantially fix the position of the wheel mount 76 relative to the axle mount 74. In the illustrated embodiment, the wheel mounts 76 each have a plurality of studs 76a, and the axle mounts 74 each have the same, or a larger, number of bores 74*a*.

The wheel mounts 76 are preferably coupled to the axle mounts 74 via the studs 76*a* and bores 74*a*, so that the hubs 78 of the wheel mounts 76 extend at a desired angular position relative to the lateral elongate members 12. In one embodiment, the wheel mounts 76 can be mounted to the axle mounts 74 so as to extend along a plane generally normal to the lateral elongate members 12. In another embodiment, the wheel mounts 76 can be mounted to the axle mounts 74 so that the hubs 78 of the wheel mounts 76 are positioned forwardly of the axle shaft 72. In still another embodiment, the wheel mounts 76 can be mounted to the axle mounts 74 so that the wheel mounts 76 are positioned rearwardly of the axle shaft 72. Advantageously, said angular positioning of the wheel mounts 76 also allows the wheelchair balance to be varied, and can also be used to accommodate rear wheels 140 of different sizes.

Once the wheel mounts 76 are coupled to the axle mounts 74 in the desired position, an axle locking mechanism 79 can be actuated to substantially lock the wheel mounts 76 in the desired position. In the illustrated embodiment, the axle locking mechanism 79 includes locking pins 79*a* insertable through corresponding holes 72*a* in the axle shaft 72. However, the axle locking mechanism 79 can have other suitable configurations. For example, the axle locking mechanism 79 can include nuts (not shown) theradably movable along the axle shaft 72 to engage and substantially hold the wheel mounts 76 in coupling engagement with the axle mounts 74.

As discussed above, the location of the axle mounts 74, as well as the angular positioning of the wheel mounts 76, can be used to vary the balance of the wheelchair. For example, the axle mounts 74 can be positioned, and/or the wheel mounts 76 oriented, so that the hubs 78 are positioned forwardly of a plane generally normal to the lateral elongate members 12 of the seat bottom portion 10 at the pivot junction 20 with the seat back portion 30. Such a configuration increases the ease with which a user can tilt the wheelchair to raise the front wheels 120 thereof off the ground during use. Similarly, the axle mounts 74 can be positioned, and/or the wheel mounts 76 oriented, so that the hubs 78 are positioned rearwardly of said plane generally normal to the lateral elongate members 12 of the seat bottom portion 10, in order to reduce the ease with which the front wheels 120 of the wheelchair can be tilted off the ground, thereby providing a wheelchair with increased balance during use.

Figure 8:
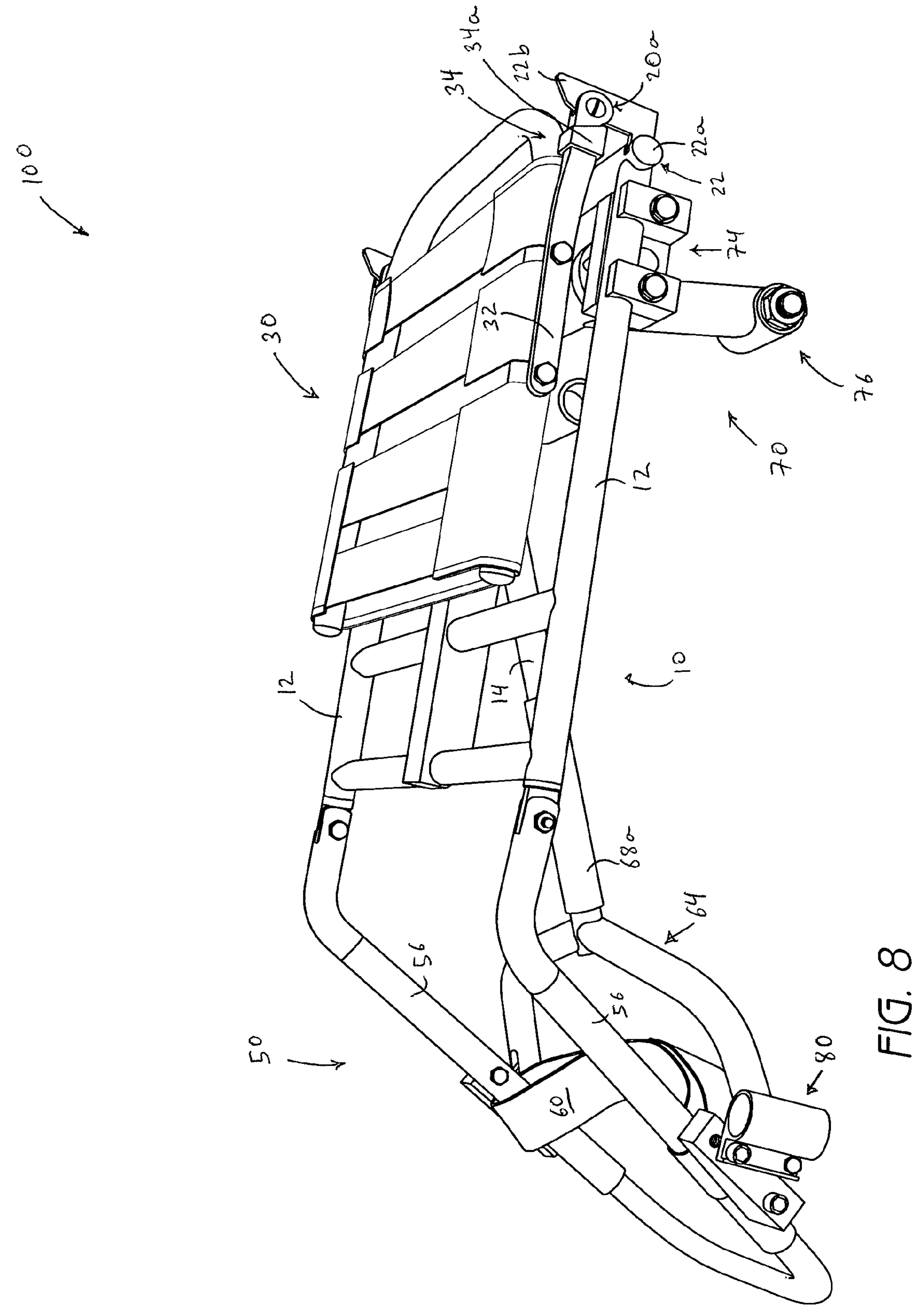
FIG. 8 is a schematic profile view of the wheelchair frame of FIG. 1 with the leg support and wheel support portions in a fully deployed configuration.

FIG. 8 shows the wheelchair frame 100 in the unfolded position, except for the unfolding of the seat back portion 30. As shown in the illustrated embodiment, the wheel mounts 76 are positioned below the axis of the axle shaft 72. Additionally, in the illustrated embodiment, the lateral elongate members 56 of the leg support frame 50 extend at an angle relative to the seat bottom portion 10 when in the unfolded position.

Figure 9:
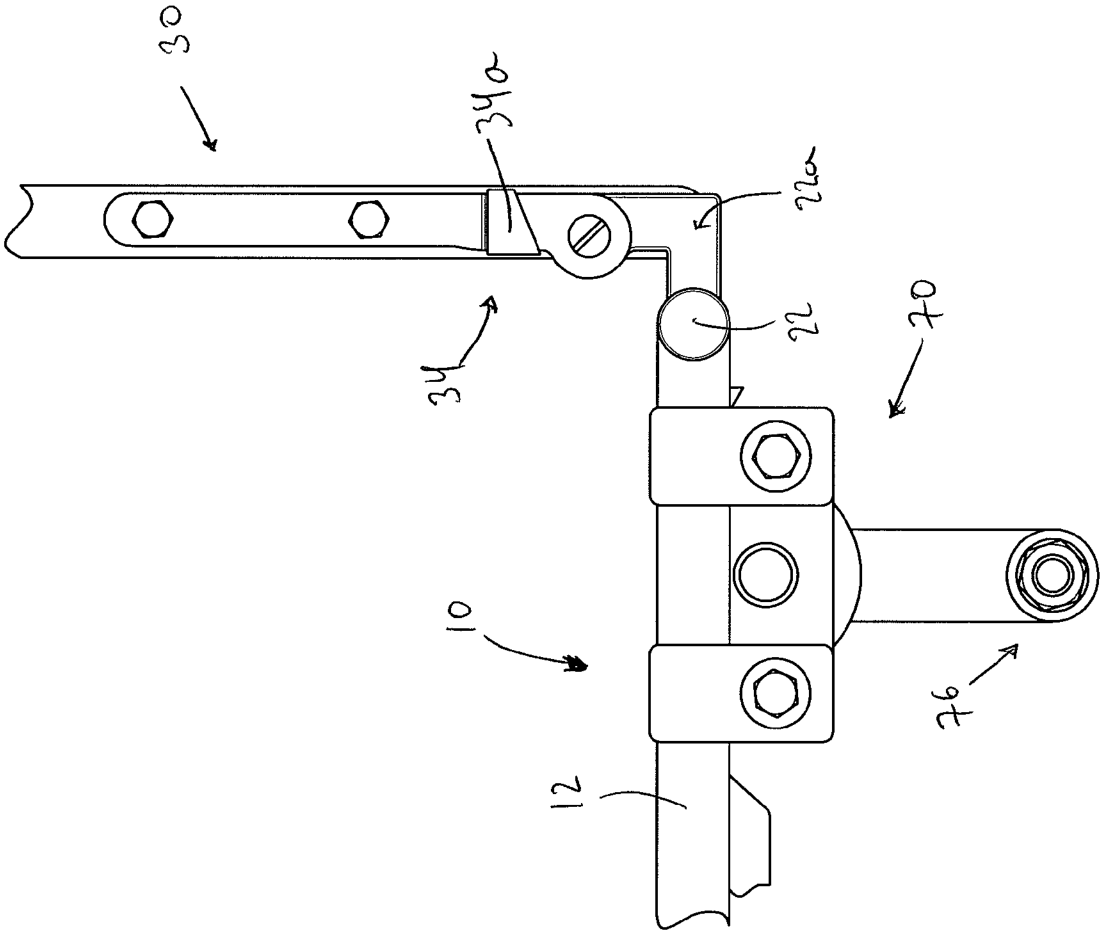
FIG. 9 is a schematic sectional view of the wheelchair frame of FIG. 8 with the back support portion in a fully deployed configuration, in accordance with one embodiment.

FIGS. 8 and 9 show the deployment of the seat back portion 30 from the folded position (FIG. 8) to the unfolded position (FIG. 9). In the illustrated embodiment, the seat back portion 30 couples to the seat bottom portion 10 via pivot connections 20 coupled to the lateral ends 22*a* of a rear cross-member 22 (see FIG. 8) of the seat bottom portion 10. The pivot connection 20 can include a connector 20*a*, such as a bolt, that couples lateral elongate members 32 of the seat back 30 to corresponding extension members 22*b* coupled to and extending generally normal to the lateral elongate members 12 of the seat bottom portion 10. A seat back locking mechanism 34 can be used to lock the position of the seat back portion 30 relative to the seat bottom portion 10, for example, in the unfolded position. In the illustrated embodiment, the seat back locking mechanism 34 includes one or more sleeve 34*a* movable over the lateral elongate member 32 and corresponding extension member 22*b*. In another embodiment, the seat back locking mechanism 34 can include two sleeves 34*a*, each movably coupled to a lateral elongate member 32 thereof and movable over the corresponding lateral elongate member 32 and extension member 22*b* to substantially lock both sides of the seat back 30 relative to the seat bottom portion 10. However, the seat back locking mechanism 34 can have other suitable configurations. For example, in one embodiment, locking pins can be inserted through holes in the lateral elongate members 32 of the seat back 30 and extension member 22*b*, said holes alignable when the seat back 30 is in the desired deployed orientation relative to the seat bottom portion 10.

Figure 10:
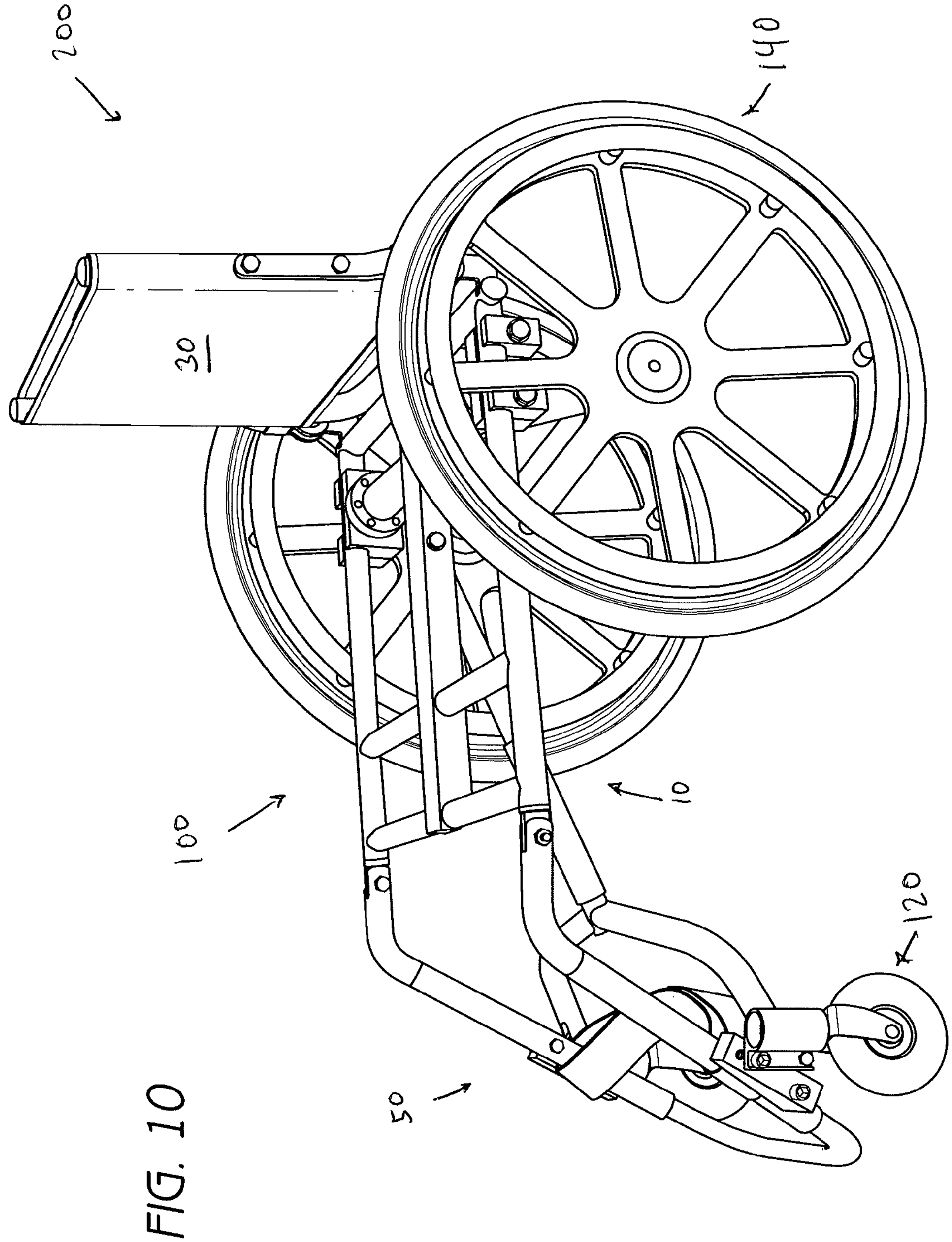
FIG. 10 is a schematic profile view of the wheelchair frame of FIG. 1 in a fully deployed configuration and assembled with rear and front wheels.

FIG. 10 shows a fully assembled wheelchair 200 having the wheelchair frame 100 in the fully deployed configuration and front and rear wheels 120, 140 attached thereto.

Figure 11:
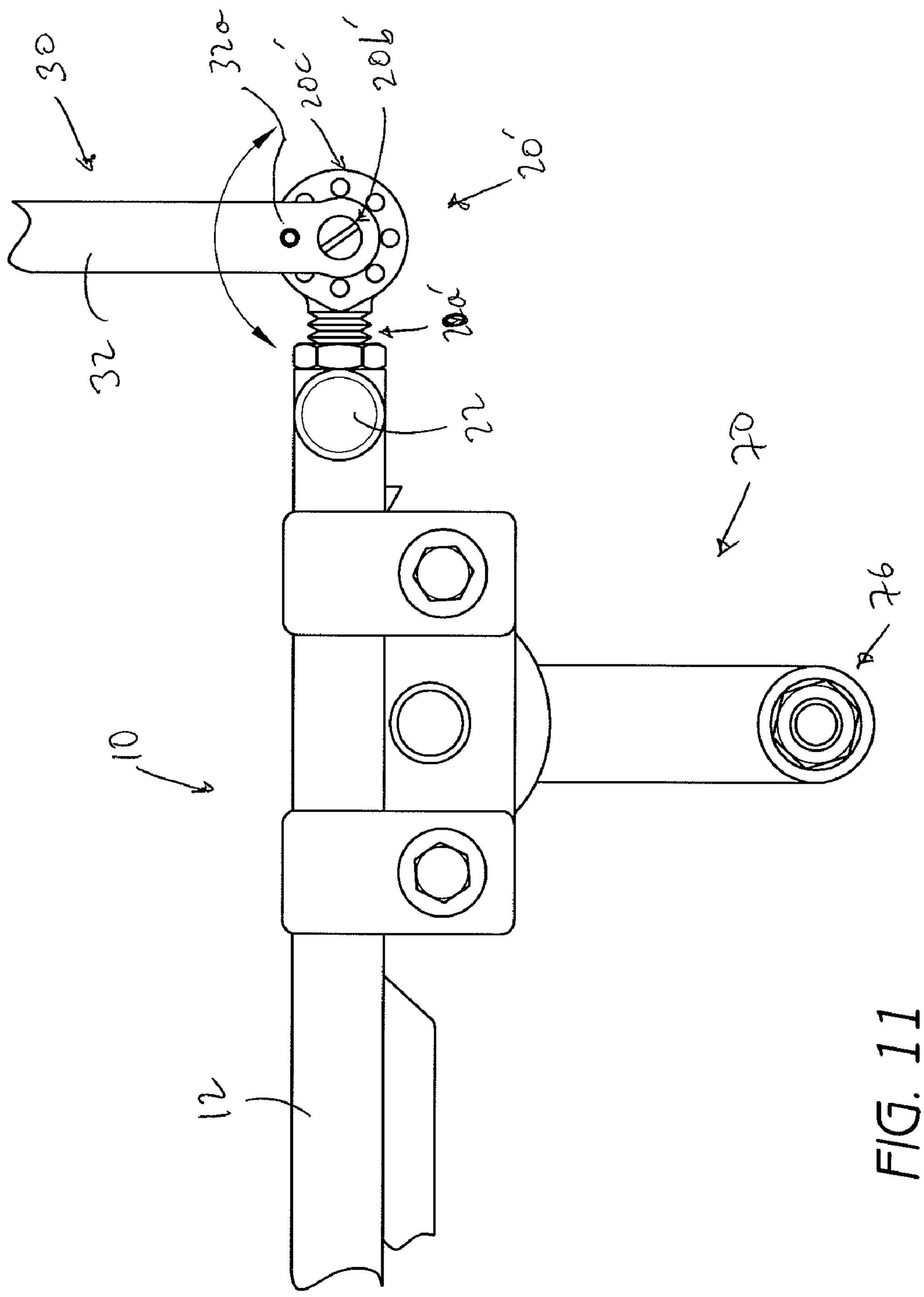
FIG. 11 is a schematic sectional view of another embodiment of a back support locking mechanism for a wheelchair frame.

FIG. 11 shows another embodiment of a pivot connection 20' between the lateral sides 32 of the seat back portion 30 and the seat bottom portion 10. In the illustrated embodiment, the pivot connection 20' includes a threaded end 20*a'* that can be threadably coupled to a corresponding thread formed in open ends (not shown) of the lateral elongate members 12 of the seat bottom portion 10. The pivot connection 20' can be coupled to the lateral elongate members 32 of the seat back 30 via a bolt 20b' extending through a center bore of the pivot joint 20'. The pivot joint 20' can also have a plurality of holes 20c' formed circumferentially about said center bore. A corresponding hole 32a can be formed on the lateral elongate members 32 of the seat back 30, said hole 32a being in alignment with said plurality of holes 20c' as the seat back 30 is pivoted relative to the seat bottom 10. The seat back 30 can be fixed relative to the pivot joint 20' by, for example, inserting a bolt, screw or pin, though the aligned holes 20c', 32a in the pivot joint 20' and the lateral elongate members 32 of the seat back 30. However, the pivot joint 20' can have other configurations. In one embodiment (not shown), the pivot joint can be a ratchet and pawl system, wherein the seat back 30 can be rotated outward from the folded position to a desired deployed position, the pawl locking said position against the ratchet. In such an embodiment, a release mechanism can be employed to release the pawl from engagement with the ratchet.

To move the wheelchair frame 100 into the folded configuration, the rear wheels 140 and front wheels 120 are removed. The seat back locking mechanism 34 is disengaged and the seat back 30 is moved into a folded position generally parallel to the seat bottom portion 10 (see FIG. 8). Also, the axle locking mechanism 79 is released and the wheel mounts 76 moved axially along the axle shaft 72 and away from the axle mounts 74 to disengage the axle mounts 74. The wheel mounts 76 are then moved toward the seat bottom portion 10 so as to extend along a plane generally parallel to the seat bottom portion 10. The leg support locking mechanism 68 is disengaged, for example, by moving the sleeve 68a to expose the pivot joint 62 between the elongate support member 14 and the fork member 64, and the leg support frame 50 is moved toward the seat bottom portion 10 so that it extends generally parallel to the seat bottom portion 10. The wheelchair frame 100 can then be easily lifted and stored in a compact storage space.

In a preferred embodiment, the wheelchair frame 100 can be made of aluminum, which provides for a lightweight, yet stiff frame. However, the wheelchair frame 100 can be made of any suitable material, such as other metals (e.g., titanium).

The wheelchair frame 100 can also include other components known in the art. For example, foldable foot rests (not shown) can be coupled to the leg support frame 50 and oriented to be foldable in a plane generally parallel to the seat bottom portion 10 when the wheelchair frame 100 is moved into the folded configuration.

Although these inventions have been disclosed in the context of a certain preferred embodiments and examples, it will be understood by those skilled in the art that the present inventions extend beyond the specifically disclosed embodiments to other alternative embodiments and/or uses of the inventions and obvious modifications and equivalents thereof. For example, though certain materials have been identified in the preferred embodiments disclosed above, one of ordinary skill in the art will recognize that other suitable materials can also be used. In addition, while a number of variations of the inventions have been shown and described in detail, other modifications, which are within the scope of the inventions, will be readily apparent to those of skill in the art based upon this disclosure. It is also contemplated that various combinations or subcombinations of the specific features and aspects of the embodiments may be made and still fall within one or more of the inventions. Accordingly, it should be understood that various features and aspects of the disclosed embodiments can be combine with or substituted for one another in order to form varying modes of the disclosed inventions. Thus, it is intended that the scope of the present inventions herein disclosed should not be limited by the particular disclosed embodiments described above.

What is claimed is:

1. A foldable wheelchair, comprising:

a seat bottom configured to support a user thereon;

a seat back movably coupled to the seat bottom, the seat back movable about an axis generally transverse to a longitudinal axis of the wheelchair between a folded position in which the seat back extends generally parallel to a plane defined by the seat bottom and one or more unfolded positions so as to provide back support to the user; and a leg support pivotably coupled to the seat bottom about an axis that lies on the plane defined by the seat bottom, the leg support movable about a second axis generally transverse to the longitudinal axis of the wheelchair between a folded position in which the leg support extends generally parallel to said plane defined by the seat bottom and an unfolded position configured to provide support to the user's legs during use of the wheelchair; a releasable locking member actuatable to lock the leg support in the unfolded position relative to the seat bottom, said locking member comprising a sleeve slidable over a pivot joint in an elongate support member that is separate from and positioned between the leg support and seat bottom to provide a generally stiff wheelchair frame in an unfolded position, the locking member locking the leg support relative to the seat bottom at a location different than said axis that lies on the plane defined by the seat bottom, wherein in the folded position the seat bottom, seat back and leg support extend along generally parallel planes.

2. A foldable wheelchair of claim 1, wherein the sleeve is spring loaded so as to be biased toward leg support locking position.

3. The foldable wheelchair of claim 1, wherein one of the one or more unfolded position of the seat back is generally normal relative to said plane defined by the seat bottom.

4. The foldable wheelchair of claim 1, wherein in the folded position the seat bottom, seat back and leg support extend along generally parallel planes that define a wheelchair frame with a height transverse to said parallel planes of no more than about six inches.

5. The foldable wheelchair of claim 4, wherein the height is no more than about five inches.

6. The foldable wheelchair of claim 1, further comprising a pair of rear wheel axle supports configured to releasably support a pair of rear wheels of the wheel chair, each of the rear wheel axle supports pivotable between a folded position wherein a plane defined by the rear wheel support is generally parallel to the plane defined by the seat bottom to one or more deployed position where the plane defined by the rear wheel support is generally non-parallel to the plane defined by the seat bottom.

7. The foldable wheelchair of claim 6, wherein the one or more deployed position of the rear wheel axle supports is defined by an angular position at which a wheel mount of the rear wheel support is mounted to a corresponding axle mount movably attached to a frame member of the seat bottom.

8. The foldable wheelchair of claim 7, wherein the one or more deployed position includes a position in which the wheel mount is positioned forwardly of the axle mount, rearwardly of the axle mount, or aligned along a plane generally normal to the frame of the seat bottom.

9. A foldable wheelchair, comprising:

a seat bottom frame defining a plane and configured to support a user thereon;

a seat back frame pivotably coupled to the seat bottom about an axis generally transverse to a longitudinal axis of the wheelchair, the seat back pivotable between a folded position in which the seat back extends generally parallel to a plane defined by the seat bottom and one or more unfolded positions so as to provide back support to the user;

a leg support frame pivotably coupled to the seat bottom frame about an axis that lies on the plane defined by the seat bottom and is generally transverse to a longitudinal axis of the wheelchair, the leg support frame movable between a folded position in which the leg support frame extends generally parallel to said plane defined by the seat bottom frame and an unfolded position configured to provide support to the user's legs during use of the wheelchair; and a releasable locking member actuatable to lock the leg support in the unfolded position relative to the seat bottom, said locking member comprising a sleeve movable relative to an elongate support member that is separate from and positioned between the leg support and seat bottom to provide a generally stiff wheelchair frame in an unfolded position, the locking member locking the leg support relative to the seat bottom at a location different than said axis that lies on the plane defined by the seat bottom, wherein the folded position the seat bottom frame, seat back frame and leg support frame extend along generally parallel planes.

10. The foldable wheelchair of claim 9, wherein the seat back frame in the folded position, leg support frame in the folded position and seat bottom frame define a maximum height along an axis transverse to said plane of no more than about six inches.

11. The foldable wheelchair of claim 9, further comprising a pair of rear wheel axle supports configured to releasably support a pair of rear wheels of the wheel chair, the rear wheel axle supports pivotable between a folded position defining a plane generally parallel to the plane defined by the seat bottom frame and one or more deployed position defining a plane generally non-parallel to the plane defined by the seat bottom frame.

12. The foldable wheelchair of claim 11, wherein the one or more deployed position of the rear wheel axle supports is defined by an angular position at which a wheel mount of the rear wheel support is mounted to a corresponding axle mount movably attached to the seat bottom frame.

13. A method for operating a foldable wheelchair, comprising:

moving a seat back pivotably coupled to a seat bottom about an axis generally transverse to a longitudinal axis of the wheelchair from an unfolded position to a folded position so that a plane defined by the seat back is generally parallel to a plane defined by a seat bottom;

moving a leg support pivotably coupled to the seat bottom about an axis that lies on the plane defined by the seat bottom and is generally transverse to the longitudinal axis of the wheelchair from an unfolded position to a folded position so that a plane defined by the leg support is generally parallel to a plane defined by a seat bottom; and moving one or more rear wheel supports releasably coupled to the seat bottom from a deployed position where a plane defined by the rear wheel support is generally non-parallel to the plane defined by the seat bottom to a folded position where the plane defined by the rear wheel support is generally parallel to the plane defined by the seat bottom; and moving a releasable locking member relative to a member of the leg support so as to unlock the leg support relative to the seat bottom, said releasable locking member actuatable to lock the leg support in the unfolded position relative to the seat bottom, said locking member comprising a sleeve slidable over a pivot joint in an elongate support member that is separate from and positioned between the leg support and seat bottom to provide a generally stiff wheelchair frame in an unfolded position, the locking member locking the leg support relative to the seat bottom at a location different than said axis that lies on the plane defined by the seat bottom, wherein in the folded position the seat bottom, seat back and leg support extend along generally parallel planes.

14. The method of claim 13, wherein in the folded position the seat bottom, seat back and leg support define a wheelchair frame with a height transverse to said parallel planes of no more than about six inches.

15. The method of claim 14, wherein the height is no more than about five inches.

* * * * *

UNITED STATES PATENT AND TRADEMARK OFFICE

CERTIFICATE OF CORRECTION

PATENT NO. : 7,896,385 B2
APPLICATION NO. : 12/235347
DATED : March 1, 2011
INVENTOR(S) : Michael Every It is certified that error appears in the above-identified patent and that said Letters Patent is hereby corrected as shown below:

In The Claims:

In column 9, Claim 9, line 25, please delete “wherein the folded”.

In column 9, Claim 9, line 26, please delete “position” and insert --wherein in the folded position--, therefor.

Signed and Sealed this
Twenty-fourth Day of April, 2012

David J. Kappos

David J. Kappos
*Director of the United States Patent and Trademark Office*